United States Patent
Ewe et al.

(10) Patent No.: US 9,225,804 B2
(45) Date of Patent: *Dec. 29, 2015

(54) METHOD AND APPARATUS FOR ACCESSING AN ENTERPRISE RESOURCE PLANNING SYSTEM VIA A MOBILE DEVICE

(71) Applicant: SYNACTIVE, INC., Foster City, CA (US)

(72) Inventors: Thomas Ewe, San Francisco, CA (US); Onur Pekerten, Istanbul (TR); Lin Ma, Sunnyvale, CA (US)

(73) Assignee: Synactive, Inc., Foster City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/667,583

(22) Filed: Mar. 24, 2015

(65) Prior Publication Data

US 2015/0201044 A1    Jul. 16, 2015

Related U.S. Application Data

(63) Continuation of application No. 13/083,988, filed on Apr. 11, 2011, now Pat. No. 8,990,427.

(60) Provisional application No. 61/342,372, filed on Apr. 13, 2010.

(51) Int. Cl.
*H04L 29/06* (2006.01)
*G06F 17/30* (2006.01)
*H04L 29/08* (2006.01)
*G06Q 10/06* (2012.01)
*H04M 1/725* (2006.01)

(52) U.S. Cl.
CPC .......... *H04L 69/08* (2013.01); *G06F 17/30893* (2013.01); *G06Q 10/06* (2013.01); *H04L 67/2823* (2013.01); *H04M 1/72563* (2013.01)

(58) Field of Classification Search
CPC ......... H04L 65/00; H04L 65/40; H04L 67/00; H04L 67/02; H04L 67/2823
USPC .......... 709/223, 224, 227, 246, 203, 217, 219
See application file for complete search history.

(56) References Cited

U.S. PATENT DOCUMENTS

| 6,058,375 | A | 5/2000 | Park et al. |
| 6,108,309 | A | 8/2000 | Cohoe et al. |

(Continued)

FOREIGN PATENT DOCUMENTS

WO    2008031625 A2    3/2008

OTHER PUBLICATIONS

GuiXT Designer Configuartion Guide, GuiXT® by Synactive, 2009, Synactive, Inc. Foster City, CA, 13 pages.

(Continued)

*Primary Examiner* — Lashonda Jacobs
(74) *Attorney, Agent, or Firm* — Ernest Huang; Pattric Rawlins; Procopio, Cory, Hargreaves & Savitch LLP

(57) ABSTRACT

A method and apparatus for accessing an enterprise resource planning system via a mobile device is described. In one embodiment, the method includes parsing data from a host application access application into at least one object in an application-specific format, converting the data into an intermediate format that is compatible with a mobile device and communicating the converted data to the mobile device.

20 Claims, 3 Drawing Sheets

(56) References Cited

U.S. PATENT DOCUMENTS

| | | | |
|---|---|---|---|
| 6,397,220 B1 | 5/2002 | Deisinger et al. | |
| 6,760,745 B1 | 7/2004 | Tan et al. | |
| 6,822,663 B2 | 11/2004 | Wang et al. | |
| 6,970,823 B1 | 11/2005 | Yago et al. | |
| 6,993,712 B2 | 1/2006 | Ramachandran et al. | |
| 7,093,195 B2* | 8/2006 | Lynch et al. | 715/221 |
| 7,137,127 B2 | 11/2006 | Slotznick | |
| 7,151,438 B1* | 12/2006 | Hall et al. | 340/286.06 |
| 7,278,110 B1 | 10/2007 | Wugofski | |
| 7,386,485 B1 | 6/2008 | Mussman et al. | |
| 7,493,591 B2 | 2/2009 | Charisius et al. | |
| 7,565,381 B2* | 7/2009 | Oswalt | 1/1 |
| 7,577,601 B1 | 8/2009 | Rademacher et al. | |
| 7,752,299 B2 | 7/2010 | Bookman et al. | |
| 7,792,784 B2 | 9/2010 | Gupta | |
| 7,805,523 B2 | 9/2010 | Mitchell et al. | |
| 7,809,600 B1* | 10/2010 | Como et al. | 705/7.25 |
| 7,899,763 B2 | 3/2011 | Machulsky et al. | |
| 7,970,943 B2 | 6/2011 | Lin et al. | |
| 8,010,605 B2 | 8/2011 | Chang | |
| 8,078,731 B1* | 12/2011 | Bruder et al. | 709/227 |
| 8,166,130 B2* | 4/2012 | Reinart | 709/217 |
| 8,214,409 B2* | 7/2012 | O'Farrell et al. | 707/802 |
| 8,271,031 B2* | 9/2012 | Boskovic | 455/556.1 |
| 8,306,862 B2* | 11/2012 | Weiler et al. | 705/20 |
| 8,429,286 B2* | 4/2013 | Pantos | 709/231 |
| 2002/0083154 A1 | 6/2002 | Auffray et al. | |
| 2003/0014496 A1 | 1/2003 | Spencer et al. | |
| 2003/0060896 A9* | 3/2003 | Hulai et al. | 700/1 |
| 2003/0231750 A1 | 12/2003 | Janveja et al. | |
| 2005/0005259 A1* | 1/2005 | Avery et al. | 717/103 |
| 2006/0041618 A1 | 2/2006 | Chang | |
| 2006/0212846 A1* | 9/2006 | O'Farrell et al. | 717/116 |
| 2006/0265662 A1 | 11/2006 | Gertzen | |
| 2007/0094597 A1 | 4/2007 | Rostom | |
| 2007/0112958 A1 | 5/2007 | Kim | |
| 2007/0124670 A1 | 5/2007 | Finck et al. | |
| 2007/0150820 A1 | 6/2007 | Salvo | |
| 2007/0220527 A1* | 9/2007 | Tolgu et al. | 719/316 |
| 2007/0234235 A1 | 10/2007 | Scott | |
| 2007/0238488 A1 | 10/2007 | Scott | |
| 2007/0238489 A1 | 10/2007 | Scott | |
| 2007/0256003 A1 | 11/2007 | Wagoner | |
| 2008/0040653 A1 | 2/2008 | Levine | |
| 2009/0013267 A1 | 1/2009 | Cudich et al. | |
| 2009/0013281 A1 | 1/2009 | Helfman et al. | |
| 2009/0083643 A1* | 3/2009 | Beringer | 715/762 |
| 2009/0204583 A1 | 8/2009 | Hechler et al. | |
| 2009/0228490 A1 | 9/2009 | Faenger | |
| 2009/0318126 A1* | 12/2009 | Schimitzek | 455/419 |
| 2010/0005053 A1 | 1/2010 | Estes | |
| 2010/0005098 A1* | 1/2010 | Millmore et al. | 707/9 |
| 2010/0037237 A1* | 2/2010 | Reinart | 719/313 |
| 2010/0049874 A1* | 2/2010 | Chene et al. | 709/246 |
| 2010/0100823 A1 | 4/2010 | Ewe et al. | |
| 2010/0153866 A1* | 6/2010 | Sharoni | 715/762 |
| 2011/0111742 A1* | 5/2011 | Neil et al. | 455/414.4 |
| 2011/0159916 A1* | 6/2011 | Boskovic | 455/556.1 |
| 2011/0307630 A1* | 12/2011 | Lange et al. | 709/246 |
| 2012/0110209 A1* | 5/2012 | Bonefas et al. | 709/246 |
| 2013/0041980 A1* | 2/2013 | Wickman | 709/217 |
| 2013/0060845 A1* | 3/2013 | Chalana et al. | 709/203 |
| 2013/0097095 A1* | 4/2013 | Rumig et al. | 705/334 |
| 2013/0103391 A1* | 4/2013 | Millmore et al. | 704/9 |
| 2013/0117444 A1* | 5/2013 | Sharma et al. | 709/224 |
| 2013/0253904 A1* | 9/2013 | Heller et al. | 704/8 |
| 2014/0164497 A1* | 6/2014 | Chalana et al. | 709/203 |

OTHER PUBLICATIONS

GuiXT Designer Configuartion Guide, GuiXT® by Synactive, 2009, Synactive, Inc. Foster City, CA, 17 pages.

International Search Report and Written Opinion mailed on May 3, 2010 for PCT/US2009/061469, 11 pages.

\* cited by examiner

METHOD AND APPARATUS FOR ACCESSING AN ENTERPRISE RESOURCE PLANNING SYSTEM VIA A MOBILE DEVICE

RELATED APPLICATION

The present application is a continuation of U.S. Pat. No. 8,990,427, filed 11 Apr. 2011, which claims the benefit of U.S. provisional patent application No. 61/342,372, filed 13 Apr. 2010, each of which is incorporated herein by reference in its entirety.

BACKGROUND

1. Field of the Invention

Embodiments of the present invention generally relate to remote database access and, more particularly, to a method and apparatus for accessing an Enterprise Resource Planning server via a mobile device.

2. Related Art

Computer systems exist that enable a user to remotely access computer information, e.g., an ERP server. Such ERP servers often use complex client applications to interface with data stored on the ERP server. These complex client applications are typically designed to execute on full desktop computers. As such, mobile devices such as personal digital assistants (PDAs), cellular phones, smart phones, net books, tablet computers, and the like generally lack processing power to effectively run these client applications. These devices also typically lack display panel space and input options, resulting in different usage patterns. Desktop interfaces are typically more complex, varied, and exploratory, while mobile interfaces prioritize quick access and ease of use for a specific purpose.

While specific server applications for converting data into the various communication formats used by these mobile devices may be developed, the myriad of different mobile device formats makes this approach cost prohibitive. Since such devices also lack the processing power needed to execute full database interface applications, there is no effective way for these mobile devices to access these ERP servers. Therefore, there exists a need in the art for a method and apparatus for accessing an enterprise resource planning server via a mobile device.

SUMMARY

Embodiments of the present invention comprise a method and apparatus for accessing an Enterprise Resource Planning ("ERP") server via a mobile device. In one embodiment, the method includes processing data from a host application access application, converting the processed data into an intermediate format that is compatible with a mobile device and communicating the converted data to the mobile device.

In one embodiment, the apparatus comprises a server application for processing data from a host application access application, converting the processed data into an intermediate format that is compatible with a mobile device and communicating the converted data to the mobile device. In one embodiment, the host application access application performs interface operations with an ERP server. In one embodiment, a native client for the mobile device renders the converted data according to one or more rules.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
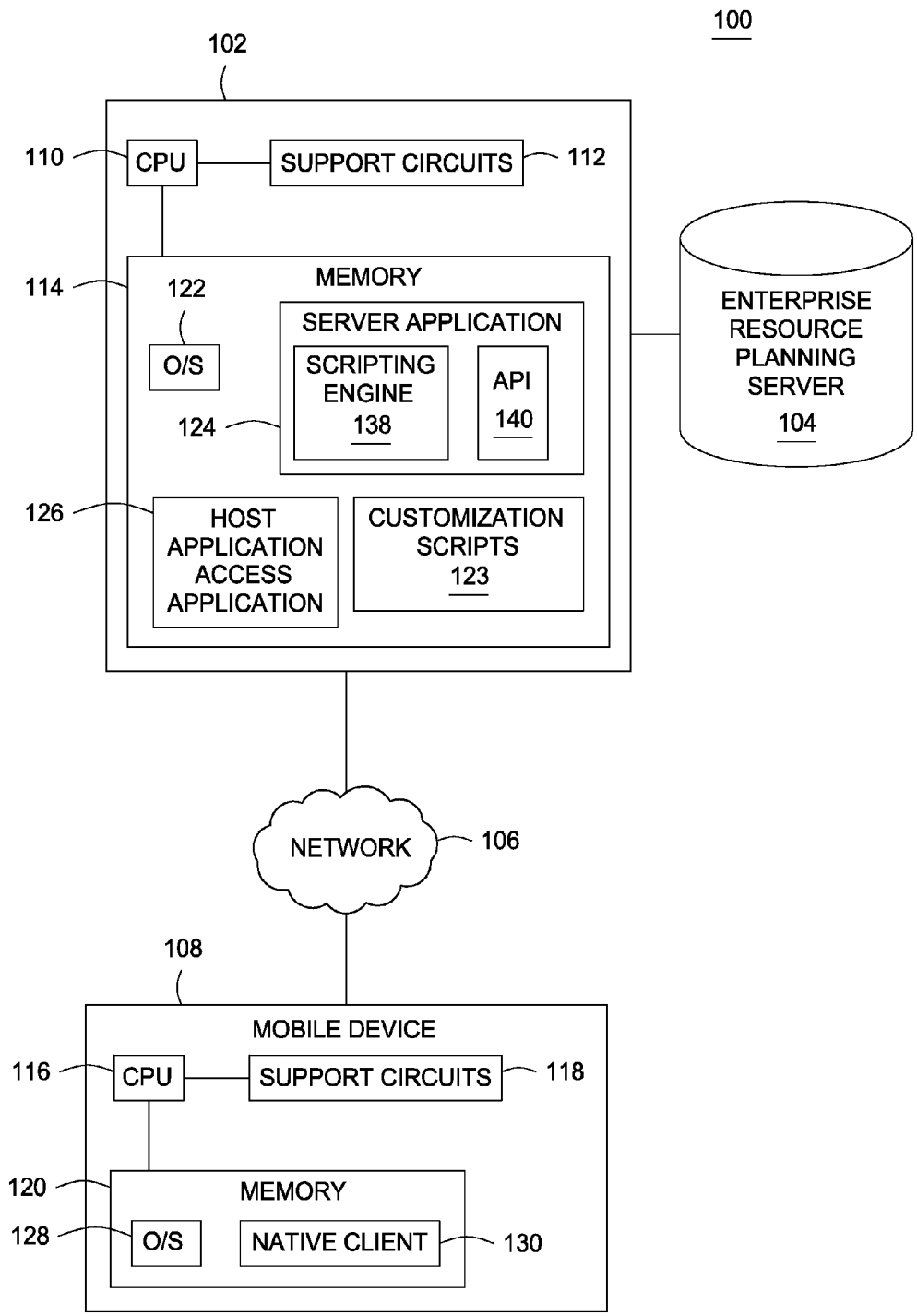
FIG. 1 is a depiction of a block diagram depicting a computer network in which an embodiment of the present invention is used.

FIG. 1 is a block diagram depicting a system 100 for providing an interface for an enterprise resource planning ("ERP") server 104 using a mobile device 108 in accordance with embodiments of the present invention. In some embodiments, the system comprises a server 102, an ERP server 104, a network 106, and a mobile device 108. The server 102 sends and receives data with the ERP server 104 during which the server 102 converts such data to an intermediate format. The server 102 sends the converted data to the mobile device 108 via the network 106.

The server is a computing device such as those generally known in the art. The server 102 comprises a central processing unit (CPU) 110, support circuits 112, and a memory 114. The CPU 110 may comprise one or more commercially available microprocessors or microcontrollers that facilitate data processing and storage. The various support circuits 112 are utilized to facilitate the operation of the CPU 110 and include such circuits as clock circuits, power supplies, cache, input/output circuits and devices, and the like. The memory 114 may comprise random access memory, read only memory, removable storage, optical disk storage, disk drive storage, and combinations thereof. The memory 114 stores an operating system 122, a server application 124, and a host application access application 126. In operation, the CPU 110 executes the operating system 122 to control the general utilization and functionality of the server 102.

The memory 114 also comprises a server application 124. The server application 124 converts data to and from an intermediate format suitable for use by the mobile device 108. The server application 124 also facilitates communication with the mobile device 108 via the network 106. In some embodiments, the server application 124 communicates with the mobile device via the hyper-text transfer protocol (HTTP), but one of ordinary skill in the art would recognize that other application layer protocols such as telnet, secure socket layer (SSL), rlogin, and the like could be used for this purpose. The server application 124 converts data received from the host application access application 126 into an intermediate format suitable to send to the mobile device 108. The server application 124 also converts data received in an intermediate format from the mobile device 108 into a format suitable for transmission to the host application access application 126.

In some embodiments, the server application 124 identifies the particular type of mobile device and creates custom device specific controls for the particular mobile device from the standard interface provided by the host application access application 126. In some embodiments, the server application 124 comprises a scripting engine 138 with a scripting environment/application programming interface ("API") 140 that executes one or more customization scripts 123. These customization scripts 123 modify behavior and screen content prior to conversion and transmission to the native client 130. Optionally, the server application 124 may also preserve sessions across native client invocations; thereby preserving the connection to the ERP system 104.

The memory 114 further comprises a host application access application 126. The host application access application 126 is a front end for the ERP server 104 as commonly known in the art. Such front ends provide access to the data and functionality provided by the ERP server 104. The host application access application 126 sends and receives commands and data to and from the server application 124 in an application server specific format.

The ERP server 104 provides business and/or enterprise management functionality to the host application access application 126. The ERP server 104 may allow a user to access data, execute programs, generate reports, and various other data access and integration tasks as known in the art. In some embodiments, the ERP server 104 is a Systems, Applications, and Products (SAP) server as provided by SAP AG of Walldorf, Germany.

The server 102 is coupled to the mobile device 108 via a network 106. The network 106 comprises a communication system that connects computers by wire, cable, fiber optic and/or wireless link facilitated by various types of well-known network elements, such as hubs, switches, routers, and the like. The network 106 may employ various well-known protocols to communicate information amongst the network resources. For example, the network 106 may be a part of the Internet or Intranet using various communications infrastructure, such as Ethernet, Wi-Fi, WiMax, General Packet Radio Service (GPRS), and the like.

The mobile device 108 is a mobile device as commonly known in the art. Such mobile devices include personal digital assistants (PDAs), cellular phones, smart phones, net books, tablet computers, and the like. In some embodiments, one or more native applications reside on the mobile device 108 to render data received from the server application 124 on the device, to wait for data entry, to take into account interruptions inherent in mobile devices (such as an incoming phone call received by a cellular phone), to perform session continuation after such an interruption, and the like.

The mobile device 108 is comprised of a CPU 116, support circuits 118, and a memory 120. The CPU 116 may comprise one or more commercially available microprocessors or microcontrollers that facilitate data processing and storage. The various support circuits 118 are utilized to facilitate the operation of the CPU 116 and include such circuits as clock circuits, power supplies, cache, input/output circuits and devices, and the like. The memory 120 may comprise random access memory, read only memory, removable storage, optical disk storage, disk drive storage, and combinations thereof. The memory 120 stores an operating system 128, and a native client 130. In operation, the CPU 110 executes the operating system 122 to control the general utilization and functionality of the mobile device 108.

The memory 120 also comprises a native client 130. The native client 130 allows a user to access the ERP server 104 by sending and receiving data and commands to and from the server application 124. The native client 130 is configured to execute on the specific type of mobile platform, such as a particular type of cellular phone or PDA. In some embodiments, the server application 124 alters data sent to the mobile device 108 to a format specific for the interface provided by the mobile device. In some embodiments the native client 130 may execute a series of rules that provides the best interpretation of data sent by the server application 124. For example, rows of buttons might be automatically converted into a table control if the mobile device was an IPHONE provided by APPLE COMPUTERS of Cupertino, Calif. Depending on the customization scripts 123, the native client 130 will render the screen and enable navigation that is native to the mobile device 108. The native client 130 may also utilize an efficient state driven polling loop that utilizes standard HTTP through the network 106. Various native clients 130, tailored for the individual mobile device 108 using custom script interpretations, enable a single version of a customization script 123 to be utilized across a variety of types of mobile devices 108.

Figure 2:
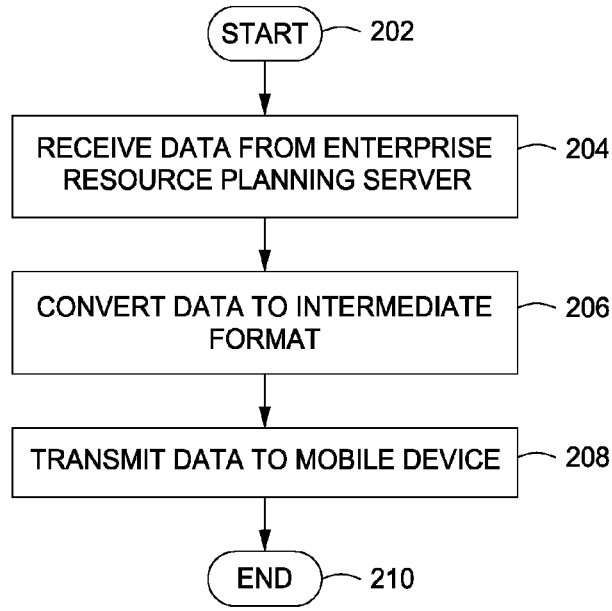
FIG. 2 is a flow diagram of a method for providing an interface to an ERP server for a mobile device in accordance with embodiments of the present invention.

FIG. 2 is a flow diagram depicting a method 200 for providing an interface to an ERP server on a mobile device in accordance with embodiments of the present invention. The method begins at step 202.

At step 204, data is received from the ERP server 104. In some embodiments, this data is received via the host application access application 126 and sent to the server application 124. Such data is typically in a format specific to the ERP server 104 and the host application access application 126. In some embodiments, the server application 124 extracts the data from an interface provided by the host application access application 126, such as by reading values contained within particular fields, accessing transaction logs created by the host application access application 126, or another method as commonly known in the art. Once the data has been extracted and/or received, the method proceeds to step 205.

At step 206, the server application 124 parses and converts the data into an intermediate format. Examples of such an intermediate format include JavaScript Object Notation (JSON) or Extensible Markup Language (XML). By translating the data into an intermediate format, the server application 124 advantageously removes the necessity for the mobile device 108 to translate directly from the host application access application-specific format, a task that traditionally involves a significant amount of processing power. Once the data is translated to the intermediate format, the method proceeds to step 208.

In some embodiments, the server application 124 processes a data stream of ERP data in binary format that is received from the host application access application 126 and recognizes structured data (e.g., name/value pairs, an array of ordered values, a Boolean, a string of characters and/or the like). For example, the server application 124 parses the binary data stream into JavaScript objects by identifying specific markers that signify each new object. The JavaScript objects are suitable for transmission to the mobile phone 108 because such objects are compatible with native mobile applications. The server application 124 builds a data structure (e.g., an array or tree) that stores a list of the JavaScript objects. As an example, each of the JavaScript objects may include customer contact information in the form of attributes (i.e., keys), such as first name, last name, age, phone number (e.g., work and home phone numbers as sub-objects), address and/or the like) having values of various data types.

At step 206, the script engine 138 executes customization scripts 123 that manipulate the data to alter and optimize the user interface that will eventually be presented on the mobile device 108 according to some embodiments. These customization operations may include renaming, adding and deleting data as received by the host application access application 126.

The customization scripts 123 remove various unnecessary fields from an invoice and retain important data fields, such as customer contact information, billing type, sales/delivery documents, payer information and/or the like according to some embodiments. Some data fields are displayed as a list and expandable into more details if desired (i.e., clicked). For example, billing items are listed along with corresponding pricing elements, which can be expanded with long text describing a specific billing item. Action items may be used to select the specific billing item and/or modify any information (e.g., price). In some embodiments, the customization scripts 123 also determine positioning of the data fields and action items on a display screen.

At step 208, the server application 124 transmits the converted data to the mobile device 108. While in the present example the server application 124 is discussed as transmitting the data, one of ordinary skill in the art would recognize that a separate web server executing on the server 102 or another networked computer would also be able to perform the same task. In some embodiments the server application 124 transmits the converted data via HTTP. In some embodiments, the server application 124 may perform additional translation functions depending upon the type of mobile device to which the data will be transmitted. The method ends when the data has been transmitted.

Figure 3:
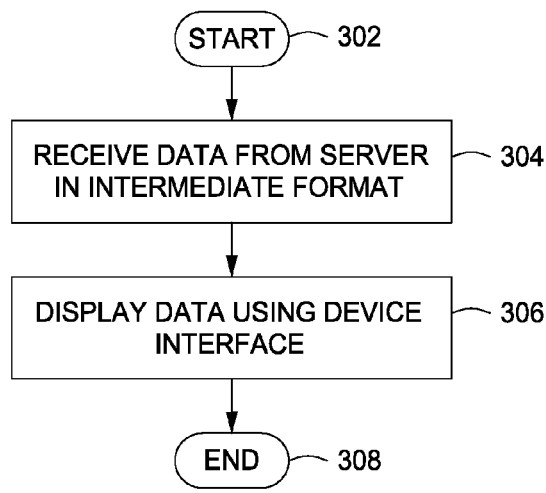
FIG. 3 is a flow diagram of a method for displaying an interface for an ERP server using a mobile device in accordance with embodiments of the present invention.

FIG. 3 is a flow diagram depicting a method 300 for accessing an ERP server using a mobile device in accordance with embodiments of the present invention. The method begins at step 302. At step 304, the native client 130 executing on the mobile device 108 receives converted data from the server 102, where the data is encoded in an intermediate format such as JSON, XML, or the like. At step 306, the native client 130 executes a series of rules to recognize certain constructs (e.g., data structures, such as objects, integers, arrays and/or the like) and render those constructs as native controls on the mobile device, such as the IPHONE example discussed with respect to FIG. 1. The native client 130 uses the converted data to generate an interface for the customization script 123 that is representative of the ERP server 104. In some embodiments, the interface is generated and updated in a manner consistent with commonly assigned U.S. patent application Ser. No. 12/590,760 and/or U.S. patent application Ser. No. 12/288,460, which are herein incorporated by reference.

In some embodiments, the native client 130 displays the converted data on the mobile phone 108 by rendering each object using a native control. Instead of displaying ERP data in an application-specific format on the mobile phone 108, the ERP data is converted into an intermediate format that is recognizable to the native client 130. Accordingly, the native client 130 may utilize one or more native controls (i.e., applications) to render the converted data locally in order to display the objects in a suitable layout for the mobile phone 108. The native client 130 may configure the converted data as a table of key/value pairs. For example, the native client 130 may display a billing due list of billing items along with each pricing date, billing date and billing document. Furthermore, each billing item is coupled to action items, such as display the billing document, issue the billing document to an accounting department and/or the like. As another example, the native client 130 may render down payment requests for recent sales orders.

At least a portion of the converted data may be augmented with a native operation on the mobile phone. For example, customer contact information may indicate a first name, a last name, an address and at least one phone number, which are displayed in a known or compatible layout (e.g., a mailing address layout or a table format). Furthermore, a particular phone number may be coupled with a link to a function for dialing the particular phone number or a function to save the particular phone number in memory (e.g., a mobile phone book for storing the customer contact information). As another example, clicking on the display or otherwise activating a link associated with the address may execute a map application that produces a real-time map of an area surrounding location associated with the address.

Figure 4:
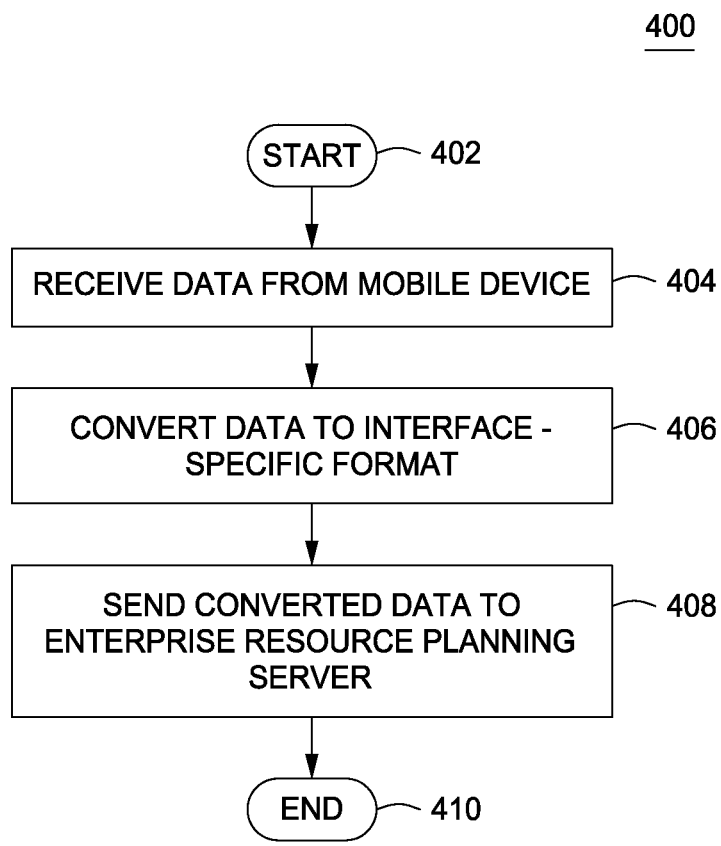
FIG. 4 is a flow diagram of a method for accessing an ERP server using a mobile device in accordance with embodiments of the present invention.

FIG. 4 is a flow diagram depicting a method 400 for forwarding data to an ERP server from a mobile device in accordance with embodiments of the present invention. The method begins at step 402.

At step 404, the server application 124 receives data from the mobile device 108. In some embodiments, the data is received in an intermediate format such as JSON or XML. The data received by the server application may represent various interface commands, operations, or data entry fields, such as mouse clicks, drag-selects, character/data entries, and the like.

At step 406, the data is converted to an interface-specific format as used by the host application access application 126. The server application 124 translates the interface operations received in the intermediate format into the corresponding interface operations performed on the host application access application 126. In some embodiments, the server application 124 may provide these operations transparently such that the host application access application 126 is unaware that the actions are not being performed locally on the server. In some embodiments, the server application 124 may translate the interface operations directly into data entry/access commands that are sent to the host application access application 126, and the host application access application 126 may be aware that said interface operations were performed remotely by a mobile device.

At step 408, the data converted into an interface-specific format is sent to the host application access application 126 for execution and/or access on the ERP server 104. The method ends at step 410 when the interface operations have been sent to the host application access application.

The foregoing description of embodiments of the invention comprises a number of elements, devices, circuits and/or assemblies that perform various functions as described. These elements, devices, circuits, and/or assemblies are exemplary implementations of means for performing their respectively described functions. In some embodiments, the server application 124 represents a means for accessing an enterprise resource planning system via a mobile device. Collectively, the server application 124, the customization scripts 123 and/or the native client 130 may form a means for accessing an enterprise resource planning system via a mobile device.

While the foregoing is directed to embodiments of the present invention, other and further embodiments of the invention may be devised without departing from the basic scope thereof, and the scope thereof is determined by the claims that follow.

What is claimed is:
1. A method, comprising:
   utilizing a processor for parsing enterprise resource planning server interface data into at least one application-specific format object;
   executing a script on the parsed data to generate modified data, the script configured to modify data related to screen content from the parsed data based on a mobile device interface representative of the enterprise resource planning server interface;

converting the modified data into converted data comprising information in an intermediate format to generate the mobile device interface having native controls of a mobile device; and communicating the converted data to the mobile device.

2. The method of claim 1 further comprising:

converting intermediate format data received from the mobile device into a host application access application format; and providing the converted intermediate format data to a host application access application.

3. The method of claim 2, wherein converting the intermediate format data received from the mobile device into the host application access application format comprises:

translating interface operations from the intermediate format data received from the mobile device into corresponding interface operations of the host application access application.

4. The method of claim 1 further comprising:

identifying a type of the mobile device; and creating one or more native controls for the mobile device type from a standard interface.

5. The method of claim 4, wherein at least one native control comprises a native operation for one of dialing a phone number or saving a phone number in memory.

6. The method of claim 4, wherein at least one native control comprises a native operation for presenting a map associated with an address.

7. The method of claim 1 further comprising:

preserving a connection to the enterprise resource planning server by preserving sessions across native client invocations.

8. A non-transitory computer readable medium storing instructions for executing a process, the instructions comprising:

parsing enterprise resource planning server interface data into at least one application-specific format object;

executing a script on the parsed data to generate modified data, the script configured to modify data related to screen content from the parsed data based on a mobile device interface representative of the enterprise resource planning server interface;

converting the modified data into converted data comprising information in an intermediate format to generate the mobile device interface having native controls of a mobile device; and communicating the converted data to the mobile device.

9. The non-transitory computer readable medium of claim 8, wherein the instructions further comprise:

converting intermediate format data received from the mobile device into a host application access application format; and providing the converted intermediate format data to a host application access application.

10. The non-transitory computer readable medium of claim 9, wherein converting the intermediate format data received from the mobile device into the host application access application format comprises:

translating interface operations from the intermediate format data received from the mobile device into corresponding interface operations of the host application access application.

11. The non-transitory computer readable medium of claim 8, wherein the instructions further comprise:

identifying a type of the mobile device; and creating one or more native controls for the mobile device type from a standard interface.

12. The non-transitory computer readable medium of claim 11, wherein at least one native control comprises a native operation for one of dialing a phone number or saving a phone number in memory.

13. The non-transitory computer readable medium of claim 11, wherein at least one native control comprises a native operation for presenting a map associated with an address.

14. The non-transitory computer readable medium of claim 8, wherein the instructions further comprise:

preserving a connection to the enterprise resource planning server by preserving sessions across native client invocations.

15. An apparatus communicatively coupled to an enterprise resource planning server, comprising:

a processor configured to:

parse enterprise resource planning server interface data into at least one application-specific format object;

execute a script on the parsed data to generate modified data, the script configured to modify data related to screen content from the parsed data based on a mobile device interface representative of the enterprise resource planning server interface;

convert the modified data into converted data comprising information in an intermediate format to generate the mobile device interface having native controls of a mobile device; and communicate the converted data to the mobile device.

16. The apparatus of claim 15, wherein the processor is further configured to:

convert intermediate format data received from the mobile device into a host application access application format; and provide the converted intermediate format data to a host application access application.

17. The apparatus of claim 16, wherein the processor is configured to convert the intermediate format data received from the mobile device into the host application access application format by:

translating interface operations from the intermediate format data received from the mobile device into corresponding interface operations of the host application access application.

18. The apparatus of claim 15, wherein the processor is further configured to:

identify a type of the mobile device; and create one or more native controls for the mobile device type from a standard interface.

19. The apparatus of claim 18, wherein at least one native control comprises a native operation for one of dialing a phone number or saving a phone number in memory or presenting a map associated with an address.

20. The apparatus of claim 15, wherein the processor is further configured to:

preserve a connection to the enterprise resource planning server by preserving sessions across native client invocations.

* * * * *